US011833951B1

(12) United States Patent
Rexius et al.

(10) Patent No.: US 11,833,951 B1
(45) Date of Patent: Dec. 5, 2023

(54) CONVEYOR SYSTEM FOR VEHICLE

(71) Applicant: Conveyor Application Systems LLC, Eugene, OR (US)

(72) Inventors: Arlen Rexius, Eugene, OR (US); David Looney, Monroe, OR (US); Jack Leroy Fanning, Junction City, OR (US)

(73) Assignee: Conveyor Application Systems, LLC, Eugene, OR (US)

( * ) Notice: Subject to any disclaimer, the term of this patent is extended or adjusted under 35 U.S.C. 154(b) by 0 days.

(21) Appl. No.: 17/682,841

(22) Filed: Feb. 28, 2022

Related U.S. Application Data

(60) Provisional application No. 63/170,317, filed on Apr. 2, 2021.

(51) Int. Cl.
*B60P 1/38* (2006.01)
*B60P 1/56* (2006.01)
(52) U.S. Cl.
CPC .. *B60P 1/38* (2013.01); *B60P 1/56* (2013.01)
(58) Field of Classification Search
CPC .......................................................... B60P 1/38
USPC ........................................................ 414/528
See application file for complete search history.

(56) References Cited

U.S. PATENT DOCUMENTS

| | | | | |
|---|---|---|---|---|
| 4,664,583 A * | 5/1987 | Gust | ...................... | B65G 17/16 198/841 |
| 4,790,715 A * | 12/1988 | Alexander | ................ | B60P 1/36 414/528 |
| 4,968,211 A * | 11/1990 | Compton | ............... | B65G 31/02 239/665 |
| 5,102,285 A * | 4/1992 | Gust | ......................... | B60P 1/38 198/849 |
| 5,207,551 A * | 5/1993 | Yelton | ................ | B65G 21/2081 198/525 |
| 5,556,237 A * | 9/1996 | Rexius | ...................... | B60P 1/60 406/48 |
| 6,036,406 A * | 3/2000 | Rexius | .................... | A01C 7/081 406/48 |
| 6,186,731 B1 * | 2/2001 | Vickers | ..................... | B60P 1/26 239/657 |
| 6,345,949 B1 * | 2/2002 | Floor | ..................... | A01D 90/10 198/833 |
| 6,357,971 B1 * | 3/2002 | Rexius | ...................... | B60P 1/60 406/48 |
| 6,361,266 B1 * | 3/2002 | Hagemeyer | ............... | B60P 1/36 222/548 |
| 6,623,234 B1 * | 9/2003 | Herring | ................... | B60P 1/286 296/183.1 |
| 6,698,997 B2 * | 3/2004 | Arne | ......................... | B60P 1/28 414/528 |

(Continued)

FOREIGN PATENT DOCUMENTS

AU 2021107369 A4 * 12/2021
CN 113060060 A * 7/2021

(Continued)

*Primary Examiner* — Joseph A Dillon, Jr.
(74) *Attorney, Agent, or Firm* — Klarquist Sparkman, LLP

(57) ABSTRACT

A truck for carrying and dispensing material includes a frame, a hopper mounted on the frame and having an opening along a lower end portion of the hopper, and a conveyor positioned underneath the hopper, wherein the conveyor comprises a conveyor belt and first and second side walls attached to opposing longitudinal side edge portions of the conveyor belt.

21 Claims, 5 Drawing Sheets

(56) References Cited

U.S. PATENT DOCUMENTS

| | | | | |
|---|---|---|---|---|
| 7,275,893 B2* | 10/2007 | Rexius | ............ | B60P 1/60 |
| | | | | 406/197 |
| 7,726,904 B2* | 6/2010 | Looney | ............ | B60P 1/42 |
| | | | | 404/110 |
| 8,100,220 B2* | 1/2012 | Rexius | ............ | B62D 5/06 |
| | | | | 701/41 |
| 10,195,976 B1* | 2/2019 | Null | ............ | E01H 10/007 |
| 10,351,038 B2* | 7/2019 | Rike | ............ | B05B 13/0221 |
| 10,688,902 B2* | 6/2020 | Rexius | ............ | B60P 1/36 |
| 2003/0161709 A1* | 8/2003 | Musso, Jr. | ............ | B60P 1/36 |
| | | | | 414/528 |
| 2003/0161710 A1* | 8/2003 | Musso, Jr. | ............ | B60P 1/286 |
| | | | | 414/528 |
| 2006/0201777 A1* | 9/2006 | Michel | ............ | B60P 1/38 |
| | | | | 198/311 |
| 2014/0286739 A1* | 9/2014 | Helmsderfer | ............ | E01C 19/2045 |
| | | | | 414/528 |
| 2017/0225600 A1* | 8/2017 | Szentimrey | ............ | B60P 1/36 |
| 2020/0391646 A1* | 12/2020 | Lowe | ............ | B60P 1/56 |
| 2021/0394659 A1* | 12/2021 | Uetake | ............ | B62B 13/0221 |
| 2022/0267101 A1* | 8/2022 | Myers, III | ............ | B65G 41/02 |
| 2022/0332238 A1* | 10/2022 | Stewart | ............ | B60P 1/36 |

FOREIGN PATENT DOCUMENTS

| | | | | |
|---|---|---|---|---|
| CN | 114590190 | A | * | 6/2022 |
| DE | 9201633 | U1 | * | 4/1992 |
| KR | 102314132 | B1 | * | 10/2021 |

* cited by examiner

US 11,833,951 B1

CONVEYOR SYSTEM FOR VEHICLE

CROSS-REFERENCE TO RELATED APPLICATION

The present application claims the benefit of U.S. Provisional Application Ser. No. 63/170,317, filed Apr. 2, 2021, the entire disclosure of which is incorporated herein by reference.

FIELD

The present disclosure concerns embodiments of a conveyor system for a dispensing material from a vehicle.

BACKGROUND

Dump trucks often carry particulate aggregate material such as sand, gravel, dirt, grain, and the like. Dump trucks usually have a large rectangular bin, or hopper, pivotally coupled to the chassis or frame of the dump truck. The forward end of the hopper can be raised to tip the hopper and discharge, or dump the contents of the hopper out of the rear tailgate of the hopper. Unloading the contents of the hopper in this manner is usually a quick way to empty the contents of the hopper. Unloading the entire load of the dump truck in this way is not always desirable because it deposits the load of the dump truck in only one location at the back of the truck. Additionally, dump trucks are often unable to deposit their loads exactly where they are needed because of obstacles between the roadway and the desired dump site. In these cases, the load must often be manually moved from the dump location to where it is needed.

To solve this problem, special conveyors called "slingers" have been coupled to hoppers of dump trucks. A slinger includes a conveyor that can be attached to receive the aggregate material gravity fed from an outlet of the hopper and convey the material to a location that is remote from the dump truck. One type of slinger truck includes a conveyor that extends longitudinally underneath the hopper of the truck and has an outlet end positioned to convey material in a direction away from the rear of the hopper. Such conveyors are provided with a skirting system that retains the aggregate material on the upper surface of the conveyor belt and prevents the aggregate material from falling off the belt in a lateral direction before reaching the outlet end of the conveyor. Unfortunately, known skirting systems are subject to wear and eventually failure, which can allow aggregate material to spill off the conveying surface and become entrapped in the conveyor belt return or other mechanical components of the system, often resulting in expensive repairs and downtime.

As such, an improved conveyor system for preventing such spillover from the conveying surface is needed.

SUMMARY

In one representative embodiment, a truck for carrying and dispensing material comprises a frame, a hopper mounted on the frame and having an opening along a lower end portion of the hopper, and a conveyor positioned underneath the hopper, wherein the conveyor comprises a conveyor belt and first and second side walls attached to opposing longitudinal side edge portions of the conveyor belt.

In another representative embodiment, a truck for carrying and dispensing material comprises a frame, a hopper mounted on the frame and having a lower end portion, wherein the lower end portion comprises two longitudinally extending lips defining an opening therebetween, and a conveyor positioned underneath the opening of hopper, wherein the conveyor comprises a conveyor belt having opposing longitudinal side edge portions that extend laterally beyond the lips, wherein the lips have lower edges spaced above an upper surface of the conveyor belt to define respective gaps between the lower edges and the upper surface of the conveyor belt.

The foregoing and other objects, features, and advantages of the invention will become more apparent from the following detailed description, which proceeds with reference to the accompanying figures.

DETAILED DESCRIPTION

Figure 1:
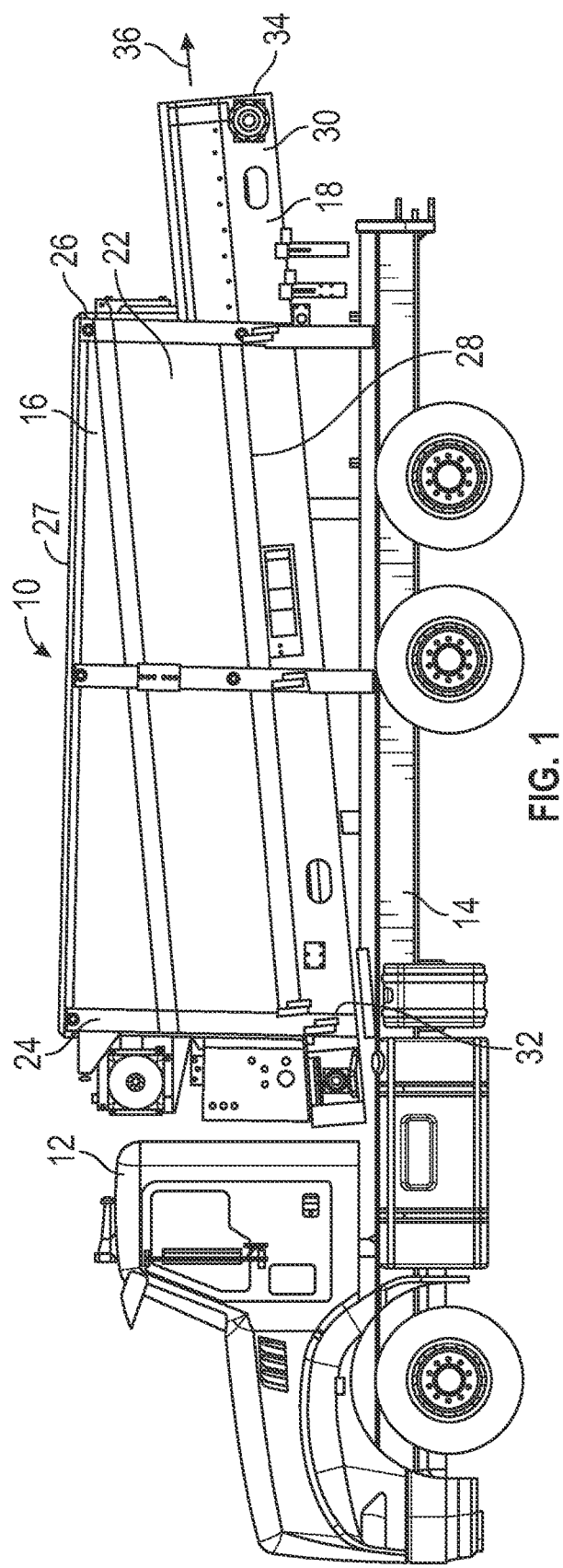
FIG. 1 is a side elevation view of a truck having a conveyor, according to one embodiment.

For purposes of this description, certain aspects, advantages, and novel features of the embodiments of this disclosure are described herein. Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A", "B", "C", "A and B", "A and C", "B and C", or "A, B, and C."

As used herein, the term "coupled" generally means physically coupled or linked and does not exclude the presence of intermediate elements between the coupled items absent specific contrary language.

In the interest of conciseness, and for the sake of continuity in the description, same or similar reference characters may be used for same or similar elements in different figures, and description of an element in one figure will be deemed to carry over when the element appears in other figures with the same or similar reference character. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

Figure 2:
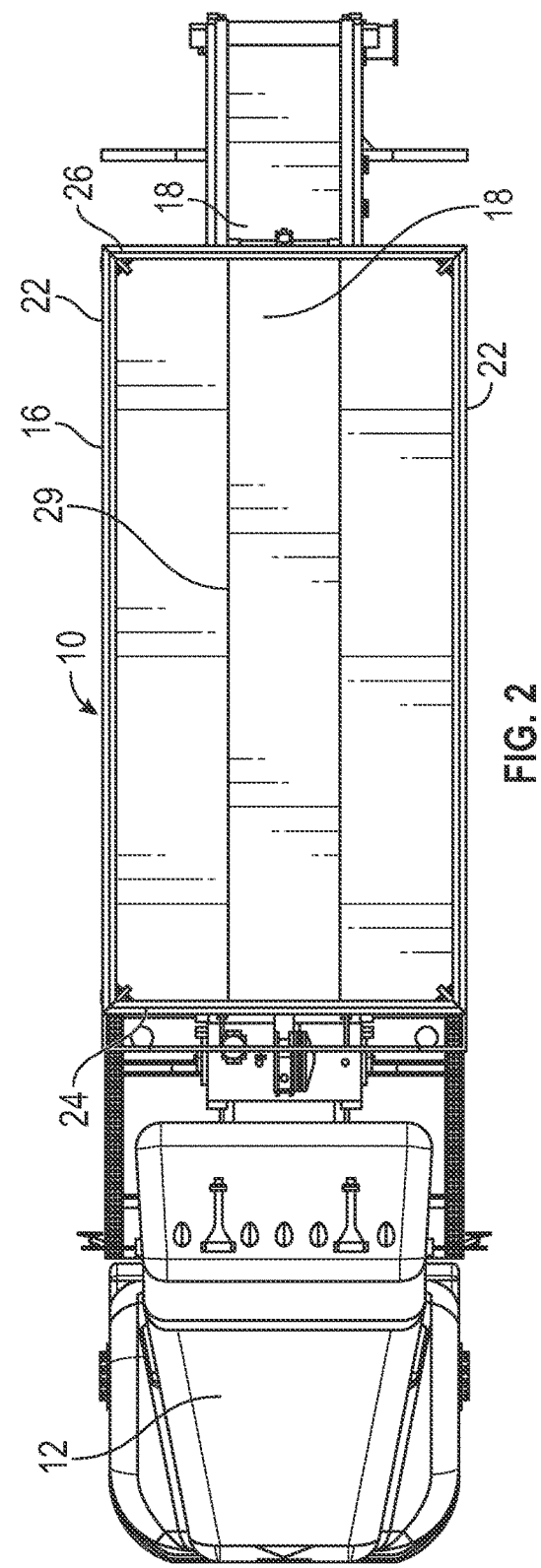
FIG. 2 is a top plan view of the truck of FIG. 1.

Referring first FIGS. 1-2, there is shown a vehicle 10, according to one embodiment. As used herein, the term "vehicle" refers generally to any vehicle that has a power source (e.g., motor or engine) or a towable vehicle that is coupled to a driven vehicle for travelling from place to place. For example, a vehicle can include, for example, a truck having a driver's cab or a trailer that is connectable to a truck or other vehicle for towing the trailer. The truck 10 can be referred to as a "slinger" truck.

The vehicle 10 in the illustrated embodiment comprises a truck having a driver's cab 12 and an integral frame 14 extending from the cab 12. In other embodiments, the frame 14 can be the frame of a trailer that is connectable to a truck or another vehicle. The vehicle 10 further comprises a material hopper, or storage bin, 16, and a conveyor 18. The hopper 16 in the illustrated configuration has two opposing, longitudinally extending sides 22, a front end 24, a rear end 26, an upper end portion 27, and a lower end portion 28. The upper end portion 27 can define an opening at the top of the hopper to receive material into the internal space of the hopper. The hopper 16 can be used to store and transport, for example, aggregate material, such as stone, rocks, soil, gravel, sand, grain, etc., although various other types of material can be used.

The conveyor 18 in the illustrated embodiment extends lengthwise of the hopper 16 underneath the lower end portion 28 from a location at or near the front end 24 towards the rear end 26. The conveyor 18 can have an outlet end portion 30 that extends rearwardly beyond the rear end 26 of the hopper 16. In the illustrated embodiment, the lower end portion 28 can have an inclined configuration having a lowermost end adjacent the front end 24 of the hopper 16 and an uppermost end adjacent the rear end 26 of the hopper 16. As such, the conveyor 18 can be similarly inclined such that a forwardmost end 32 of the conveyor adjacent the front end 24 of the hopper 16 is lower than a rearmost end 34 of the conveyor.

The lower end portion 28 of the hopper can define an opening or chute 29 positioned directly over and aligned with the conveyor 18. The opening 29 can extend the entire length or substantially the entire length of the hopper as shown. In other embodiments, the lower end portion 28 can define a closed floor at the bottom of the hopper with the floor defining an opening at the front end 24 of the hopper.

Material stored in the hopper 16 can be gravity fed onto the conveyor through the opening 29. Material on the conveyor 18 is then carried toward the outlet end portion 30 and dispensed from the rearmost end 34 in the direction of arrow 36. Depending on the speed of the conveyor 18, the material can be dispensed or "thrown" a desired distance from the rear of the vehicle 10.

In other embodiments, the lower end portion 28 of the hopper can be horizontal and the conveyor 18 can be oriented in a horizontal position (i.e., the opposing ends 32, 34 are at the same height).

In some embodiments, the conveyor 18 can be a first conveyor and the vehicle 10 can include a second conveyor (not shown) mounted to the frame 14 and/or the hopper 16 that receives material from the first conveyor 18 and dispenses the material to a desired location. In such embodiments, the first conveyor can be referred to as a "feed conveyor" and the second conveyor can be referred to as a "placing conveyor". The placing conveyor can be used for dispensing material greater distances from the vehicle and/or for varying the direction in which the material is dispensed from the vehicle. Further details regarding a placing conveyor that can be used with the vehicle 10 is disclosed in U.S. Pat. No. 10,688,902, which is incorporated herein by reference.

Figure 3:
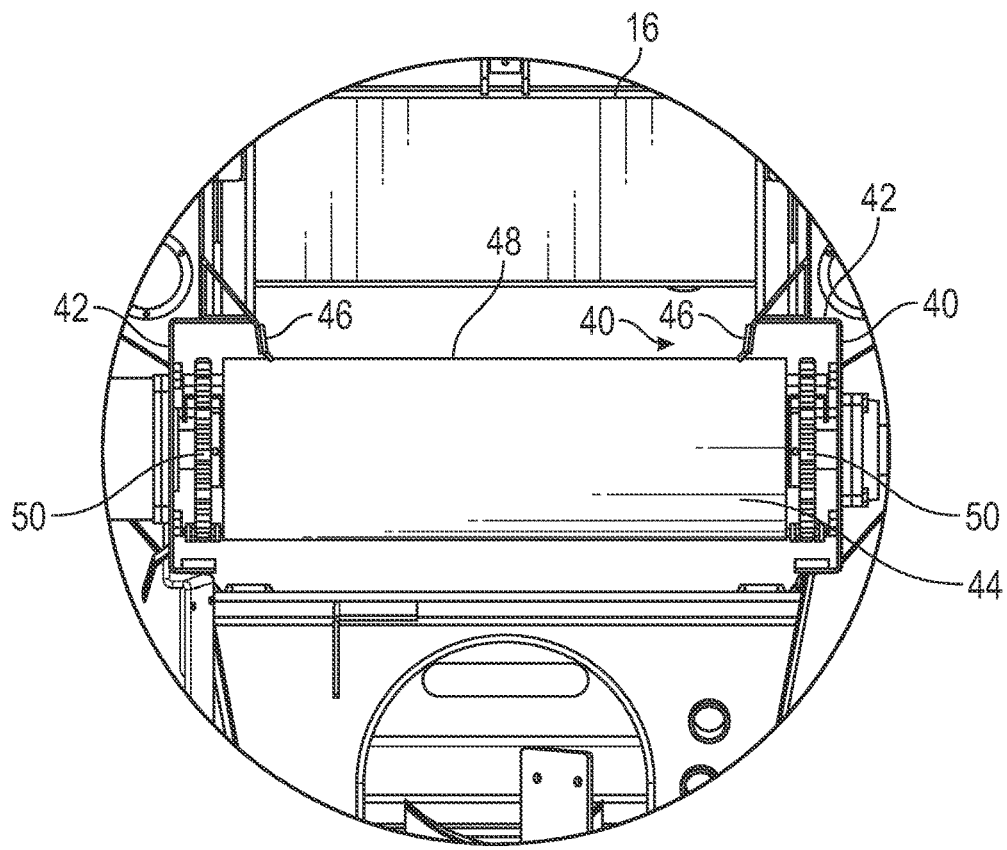
FIG. 3 is a rear end view of a hopper and a conveyor of a truck, according to one embodiment.

FIG. 3 is a rear end view of the conveyor 18 and the hopper 16 incorporating a known skirting assembly 40. As shown, the lower end portion 28 of the hopper 16 can include two generally U-shaped structures 42 positioned adjacent the longitudinal sides of a conveyor belt 44. Mounted to each U-shaped structure 42 is a flexible sealing member 46 that have lower ends in contact with an upper surface 48 of the conveyor belt 44. The sealing members 46 typically are made from natural rubber. The conveyor belt 44 can be reeved around pulleys (not shown) at the forward and rear ends of the conveyor 18, which pulleys can be driven by chains 50, as known in the art. The chains 50 can be driven by one or more motors to produce corresponding rotation of the chains and the pulleys and corresponding motion of the conveyor belt 44, as known in the art.

In use, the conveyor belt 44 moves relative to the side walls 44, which retain material on the upper surface 48 until it is dispensed from the outlet end portion of the conveyor. Friction between the sealing members 46 and the belt 44 can wear the sealing members 46, eventually causing tearing that can allow spillover of the aggregate material from the longitudinal sides of the conveyor belt 44. As mentioned above, the spilled over aggregate material can become entrapped in mechanical components of the conveyor, requiring further maintenance of the vehicle.

Figure 4:
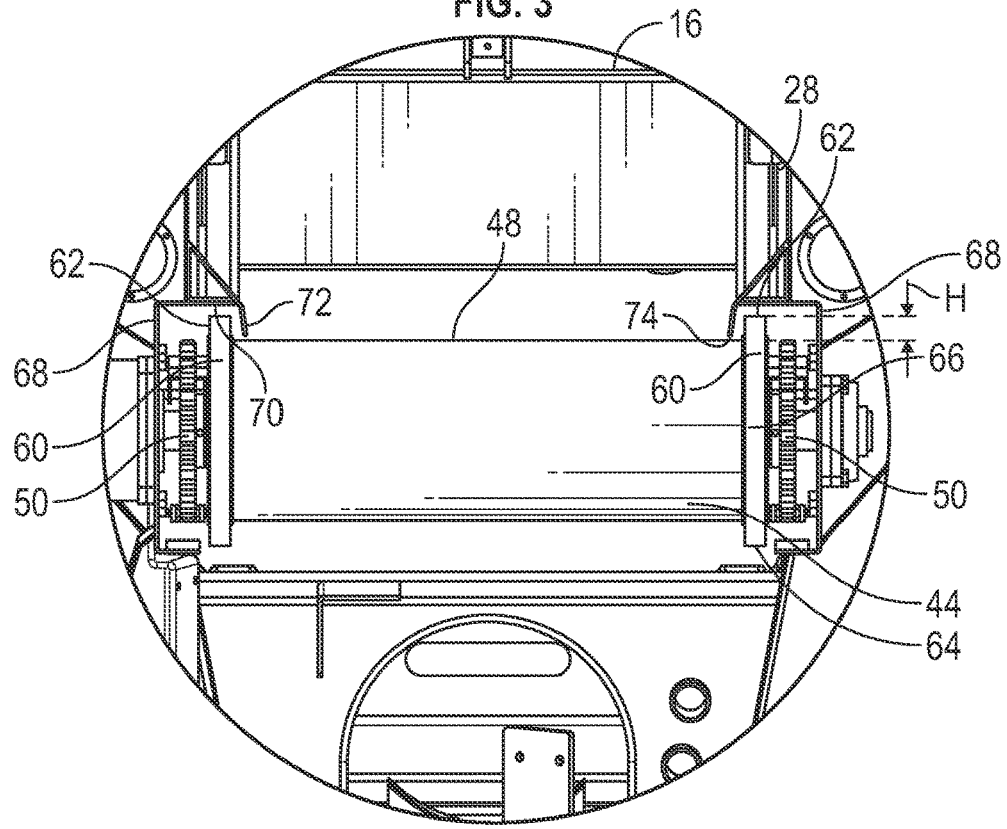
FIG. 4 is a rear end view of a hopper and a conveyor of a truck, according to one embodiment.
Figure 5:
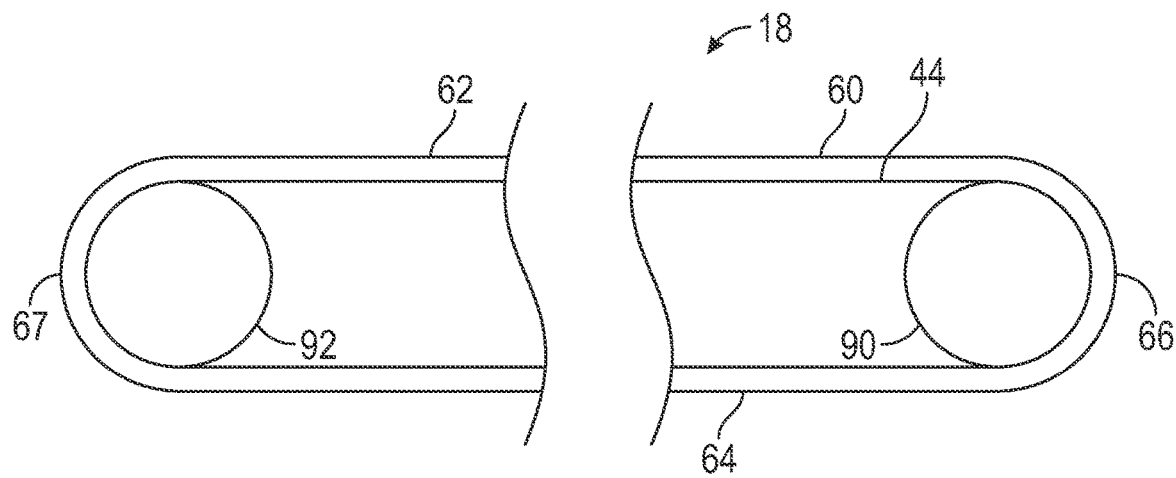
FIG. 5 is a schematic side view of the conveyor of FIG. 4.

FIG. 4 is a rear end view of the conveyor 18 and the hopper 16 incorporating a "skirt-less" system for containing material on the upper surface 48 of the conveyor belt 44, according one embodiment. FIG. 5 is a schematic side view of the skirt-less conveyor 18. In this embodiment, the conveyor 18 includes two upstanding side walls 60 mounted to the conveyor belt 48. As shown in FIGS. 4-5, each side wall 60 can be mounted along an entire longitudinal side edge portion of the conveyor belt 44, and thus forms an upper run 62, a lower run 64, a rear curved run 66 extending around a rear pulley 90, and a forward curved run 67 extending around a forward pulley 92. Thus, each side wall 60 can extend continuously along the corresponding longitudinal edge portion of the conveyor belt 44 in a closed loop.

In the illustrated embodiment, the side walls 60 extend perpendicularly with respect to the conveyor belt. In other embodiments, the side walls 60 can angled with respect to the conveyor belt. For example, each side wall can oriented to form an angle greater than or less than 90 degrees with respect to the upper surface 48 of the conveyor belt.

As shown in FIG. 4, the lower end portion 28 of the hopper 16 can include U-shaped structures 68 shaped to form partial enclosures extending around the side walls 60 along the upper run 62. Each U-shaped structure 68 can extend lengthwise of the conveyor belt 44 the entire length or at least a majority of the length of the upper run 62 of the side wall 60. Each U-shaped 68 can have an inwardly extending portion 70 that extends over the side wall 60 and a portion of the upper surface 48 of the conveyor belt in a lateral direction and a side wall or lip 72 that extends downwardly from the portion 70 toward the upper surface 48. Each lip 72 has a lower edge 74 that is spaced above the upper surface 48 of the conveyor belt, thereby forming a gap between the lower edge 74 and the upper surface 48.

The lip 72 and the gap can be sized to contain most of the material to be dispensed on the upper surface 48 of the conveyor while avoiding contact with the upper surface 48. Depending on the size of the material, some material can travel laterally underneath the lips 72 but is contained on the upper surface 48 of the belt by the side walls 60 until the material is dispensed from the outlet end of the conveyor. In particular embodiments, the height of the gaps between the lower edges 74 and the upper surface 48 can be at least ⅛ inch. In some embodiment, the height of the gaps can be in the range of ⅛ inch to 2 inches, or ⅛ inch to 1 inch, with ⅜ inch being a particular example. In some examples, the height of the gaps can be less than ⅛ inch so long as the lower edges 74 do not contact the upper surface 48 of the belt 44. In other examples, the size of the gaps can be greater than 2 inches. As best shown in FIG. 4, the side walls 60 have a height H that is greater than the height of gaps to block any material that passes underneath the lower edges 74 of the lips 72. In particular embodiments, the side walls 60 have a height H of at least ¼ inch, at least ½ inch, at least 1 inch, at least 2 inches, at least 3 inches, at least 4 inches, or greater than 4 inches.

Figure 6:
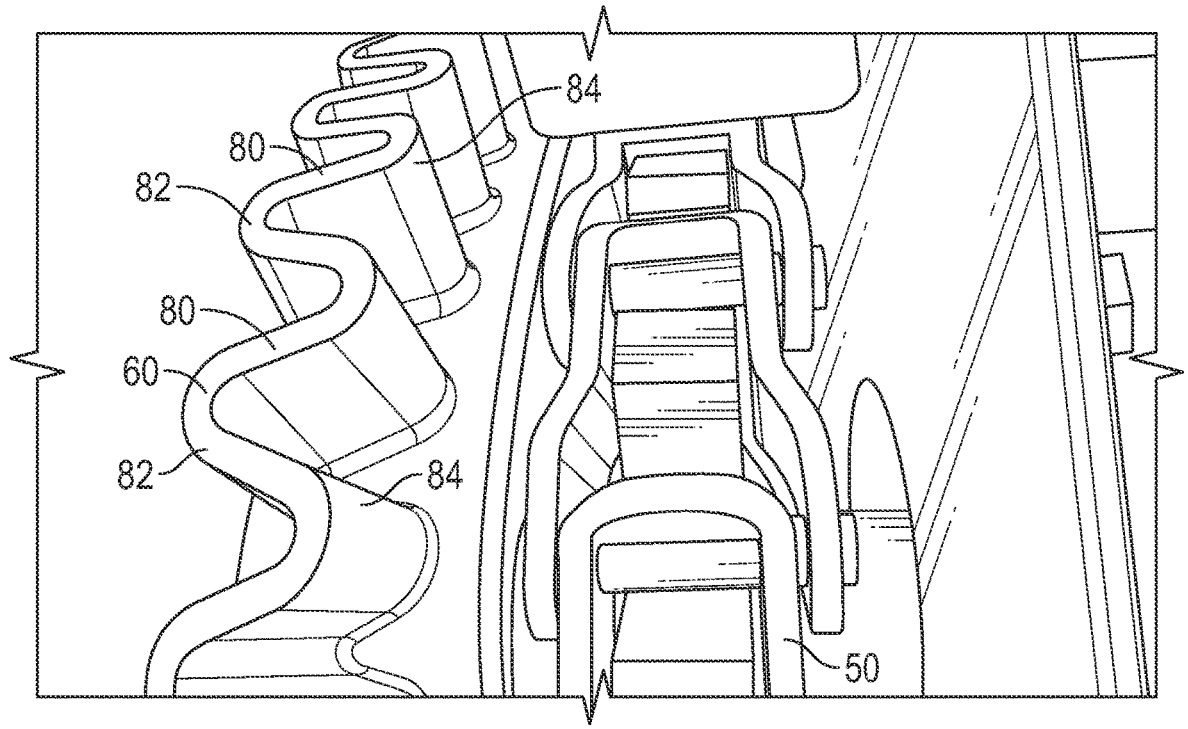
FIG. 6 is a perspective view of a section of a side wall of the conveyor belt of FIGS. 4-5, according to one embodiment.
Figure 7:
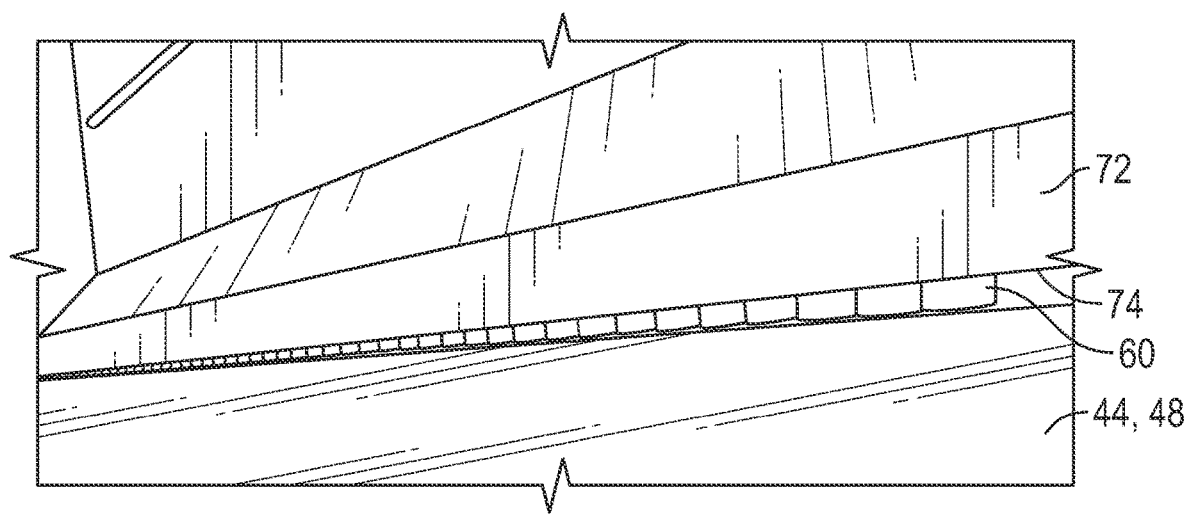
FIG. 7 is a perspective view of the conveyor of FIG. 4 as viewed from inside the conveyor.

FIG. 6 shows one specific configuration for the side walls 60. In the embodiment of FIG. 6, the side wall 60 has a corrugated or undulating shape forming a series of angled wall sections 80 connected by a series of first curved sections 82 pointing inwardly toward the center of the conveyor belt 44 alternating with second curved sections 84 pointing away from the conveyor belt 44. FIG. 7 shows the upper surface 48 of the conveyor belt 44 and a lip 72 from inside the conveyor 18. As can be seen here, the lower edge 74 of the lip 72 is spaced above the upper surface 48, showing a lower portion of the side wall 60 behind the lip 72.

Figures 8, 9:
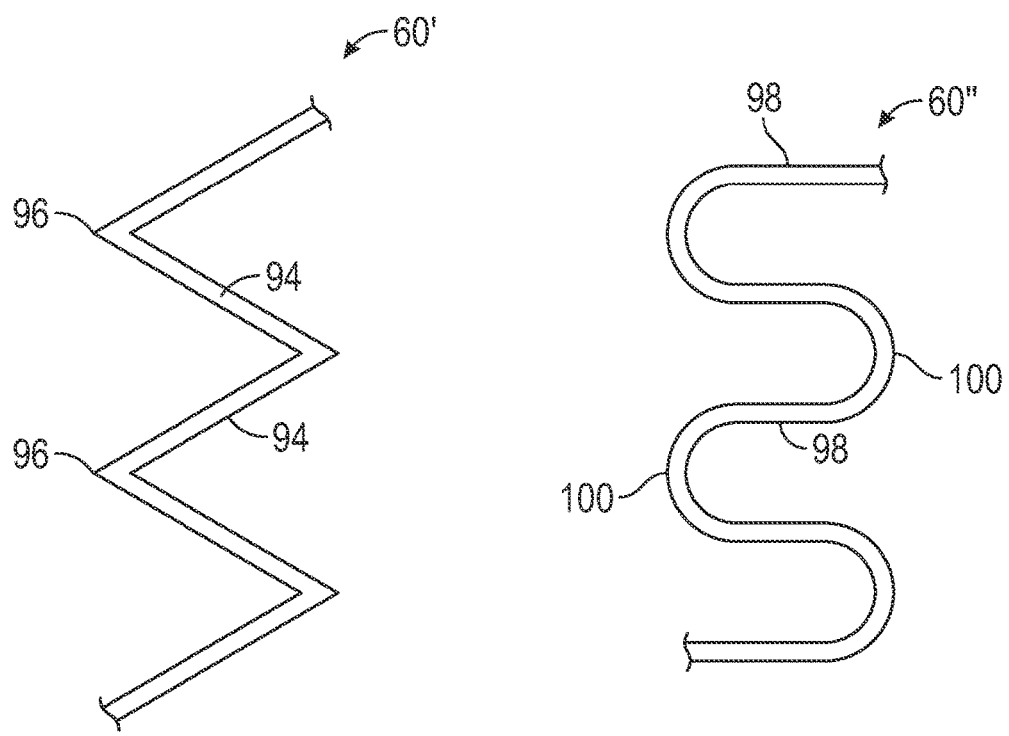
FIG. 8 is a top plan view of a corrugated side wall for a conveyor belt, according to another embodiment.
FIG. 9 is a top plan view of a corrugated side wall for a conveyor belt, according to another embodiment.

In alternative embodiments, the side walls 60 can have various other shapes or configurations. For example, as shown in FIG. 8, a side wall 60' can have a zig-zag configuration comprising angled wall sections 94 connected to each other at non-curved vertices 96. In another embodiment, as shown in FIG. 9, a side wall 60" can have parallel wall sections 98 connected by curved sections 100.

The side walls 60 can be formed from any of various materials and can be attached to the conveyor belt 44 using any of various techniques and mechanisms. In particular embodiments, the side walls 60 can be made from any of various elastomers, including natural rubber or synthetic elastomers, such as polyurethane. In one specific example, the side walls 60 and the conveyor belt 44 can be formed from natural rubber and can be bonded to each other by vulcanization. In other embodiments, the side walls 60 and the conveyor belt 44 can be molded to each other. In still other embodiments, the side walls 60 and the conveyor belt 44 can be separately formed (from the same or different materials) and subsequently attached to each other, such as with an adhesive, welding, and/or mechanical fasteners (e.g., bolts or screws).

Due to the shape of side walls 60, the side walls 60 can deform as they rotate around the rear and front pulleys 90, 92 of the conveyor 18 to accommodate the increase in the effective length of side walls along the curved runs 66, 67 due to the curvature of the pulleys 90, 92 and the conveyor belt 44 at those locations. In particular, due to the corrugated shape of the side walls 60, the angle or spacing between the wall sections 80 can increase as the side walls rotate around the pulleys to accommodate the tensile forces applied to the side walls by the conveyor belt as it transitions from a straight configuration to a curved configuration. The corrugated shape of the side walls 60 also permit tensioning of the belt 44 by deforming under tensile forces applied to the ends of the belt when adjusting the spacing between the pulleys 90, 92.

Figure 10:
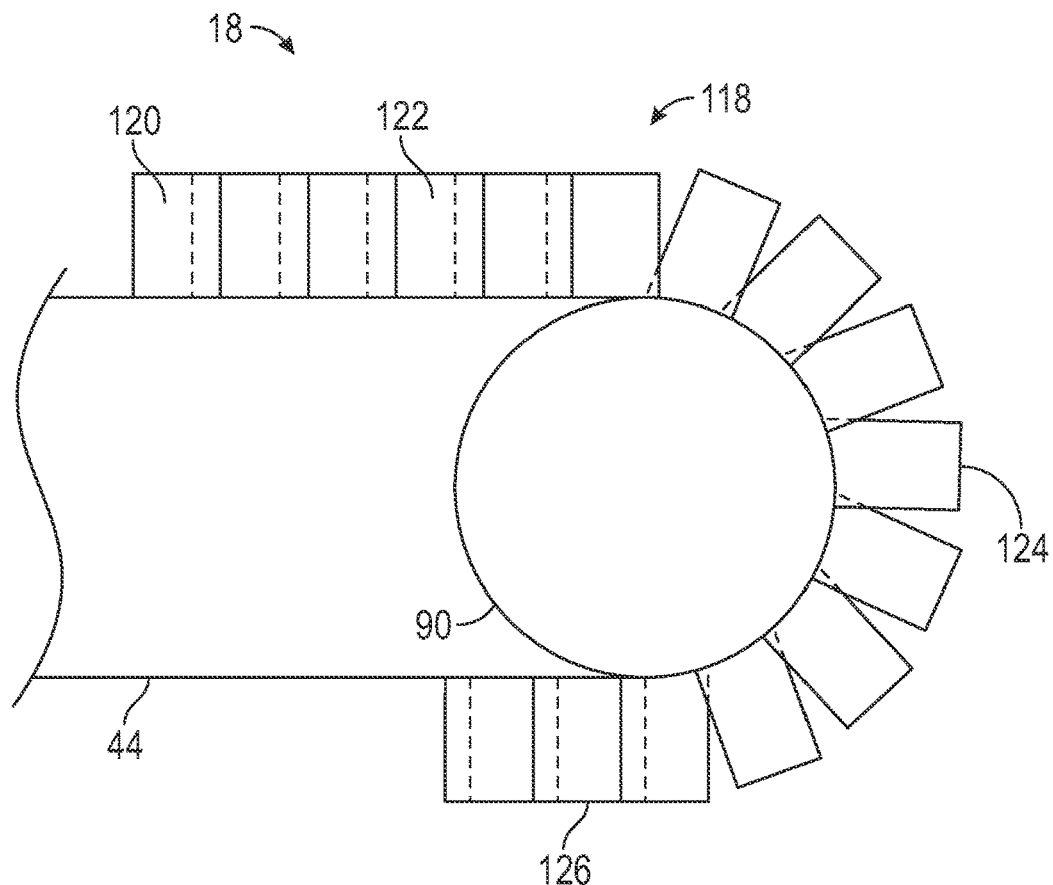
FIG. 10 is a schematic side view of a conveyor, according to another embodiment.

FIG. 10 shows another configuration for the side walls. In this embodiment, each side wall comprises a segmented wall 118 having a series discrete slats 120 attached to the conveyor belt 44. The materials for forming the slats and techniques for attaching them to the conveyor can be any of those discussed above for the embodiment of FIG. 6. Each slat 120 is individually attached to the conveyor belt 44 but not to each other so that they can separate and/or move relative to each other as the conveyor belt 44 moves around and conforms to the curvature of the pulleys 90, 92. For example, as shown in FIG. 10, the slats 120 form an upper run 122 of slats in which the slats are parallel to each other. As they transition from the upper run 122 to a curved run 124 around the pulley 90, the slats 120 become angled relative to each other and gaps can form between adjacent slats. As the slats 120 transition from the curved run 124 to a lower run 126, the slats can revert back to their parallel position.

As further shown in FIG. 10, the slats 120 can be positioned in a partially overlapping position relative to each other such that each slat 120 partially overlaps an adjacent slat in a longitudinal direction of the conveyor to ensure no gaps are formed between adjacent slats and prevent the passage of material between the slats. In other embodiments, each slat 120 can be positioned without any overlap with an adjacent slat 120. Instead, each slat 120 can be positioned with a vertical side edge abutting a vertical side edge of an adjacent slat. In still other embodiments, each slat 120 can be slightly spaced apart from an adjacent slat in the longitudinal direction of the conveyor to form small gaps that are appropriately sized to prevent the passage of relatively larger particles through the gaps.

Figure 11:
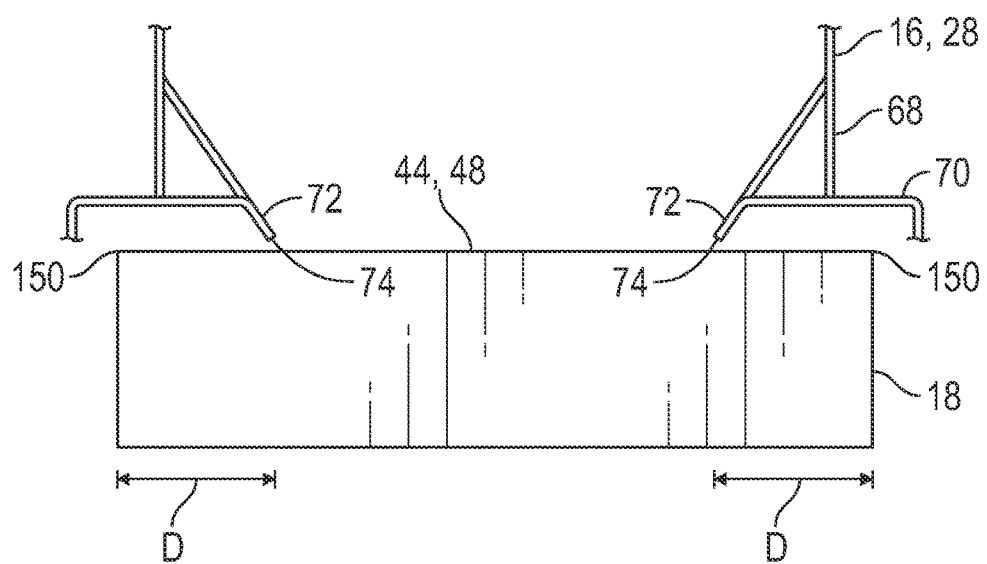
FIG. 11 is a rear end view of a conveyor and a hopper, according to another embodiment.

FIG. 11 is a rear end view of a hopper 16 and a skirt-less conveyor 18, according to another embodiment. The embodiment of FIG. 11 is similar to the embodiment of FIG.

4, except that the conveyor belt 44 does not include any side walls 60. However, the width of the conveyor belt 44 is sized to extend laterally beyond the lips 72 a sufficient distance D to prevent spillover from the longitudinal edges 150 of the conveyor belt 44. Material to be dispensed on the upper surface of the conveyor belt may pass underneath lips 72 toward the edges 150, but the additional distance D can minimize or prevent the material from reaching and spilling over the edges. For example, in certain embodiments, the distance D can be at least 2 inches, at least 3 inches, at least 4 inches, at least 5 inches, or greater. In embodiments where the conveyor does not include any side walls 60, the lower end portion 28 of the hopper 16 and the conveyor 18 desirably have a horizontal orientation, or the angle of inclination of the conveyor desirably is relatively small to minimize the effect of gravity on the material to be dispensed as it is moved toward the rear end of the hopper on the upper surface of the conveyor belt.

In some embodiments, the distance D can be selected based on the height of the gaps between the lower edges 74 and the upper surface 48 of the belt 44. For example, the distance D can be at least twice the height of the gaps between the lower edges 74 and the upper surface 48 of the belt 44, which can be sufficient for containing aggregate material having an angle of repose of at least 45 degrees (e.g., sand) without spillover. Thus, for example, if the gaps between the lower edges 74 and the upper surface 48 of the belt 44 are 1 inch, the distance D can be 2 inches. In some examples, increasing the distance D to at least three times the height of the gaps between the lower edges 74 and the upper surface 48 of the belt 44 provides a safety factor for containing aggregate material without spillover. Thus, for example, if the gaps between the lower edges 74 and the upper surface 48 of the belt 44 are 1 inch, the distance D can be 3 inches.

Generally speaking, it is desirable to minimize the overall width of the belt 44 between the longitudinal edges 150 while still being wide enough to contain the aggregate material. Thus, in particular embodiments, the distance D is no more than twice the height of the gaps between the lower edges 74 and the upper surface 48 of the belt 44. Further, in certain embodiments, the distance D is no more than three times the height of the gaps between the lower edges 74 and the upper surface 48 of the belt 44.

In alternative embodiments, the conveyor of 18 of FIG. 11 can include side walls (e.g., side walls 60, 60', 60" or 118) positioned along the longitudinal side edge portions of the conveyor belt.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A truck for carrying and dispensing material comprising:
   a frame;
   a hopper mounted on the frame and having an opening along a lower end portion of the hopper; and
   a conveyor positioned underneath the hopper, wherein the conveyor comprises a conveyor belt and first and second side walls attached to opposing longitudinal side edge portions of the conveyor belt.

2. The truck of claim 1, wherein the lower end portion of the hopper comprises two longitudinally extending lips positioned adjacent the side edge portions of the conveyor belt, wherein the lips have lower edges spaced above an upper surface of the conveyor belt to define respective gaps between the lower edges and the upper surface of the conveyor belt.

3. The truck of claim 2, wherein the gaps have a height in the range of ⅛ inch to 1 inch.

4. The truck of claim 3, wherein the gaps have a height of at least ⅜ inch.

5. The truck of claim 2, wherein each side edge portion of the conveyor belt extends laterally beyond a corresponding lip a distance of at least 3 inches.

6. The truck of claim 2, wherein the side walls have a height greater a height of the gaps.

7. The truck of claim 1, wherein the side walls have a corrugated shape.

8. The truck of claim 1, wherein each side wall forms a closed loop.

9. The truck of claim 1, wherein each side wall comprises a plurality of discrete slats.

10. The truck of claim 9, wherein each slat overlaps an adjacent slat in a longitudinal direction of the conveyor belt.

11. The truck of claim 1, wherein the side walls are bonded to the conveyor belt.

12. A truck for carrying and dispensing material comprising:
    a frame;
    a hopper mounted on the frame and having a lower end portion, wherein the lower end portion comprises two longitudinally extending lips defining an opening therebetween; and
    a conveyor positioned underneath the opening of hopper, wherein the conveyor comprises a conveyor belt having opposing longitudinal side edge portions that extend laterally beyond the lips, wherein the lips have lower edges spaced above an upper surface of the conveyor belt to define respective gaps between the lower edges and the upper surface of the conveyor belt.

13. The truck of claim 12, wherein the gaps have a height in the range of ⅛ inch to 1 inch.

14. The truck of claim 13, wherein the gaps have a height of at least ⅜ inch.

15. The truck of claim 12, wherein each side edge portion of the conveyor belt extends laterally beyond a corresponding lip a distance of at least 3 inches.

16. The truck of claim 12, wherein the conveyor comprises first and second side walls attached to the opposing longitudinal side edge portions of the conveyor belt.

17. The truck of claim 16, wherein the side walls have a corrugated shape.

18. The truck of claim 16, wherein each side wall forms a closed loop.

19. The truck of claim 16, wherein each side wall comprises a plurality of discrete slats.

20. The truck of claim 19, wherein each slat overlaps an adjacent slat in a longitudinal direction of the conveyor belt.

21. The truck of claim 12, wherein each side edge portion of the conveyor belt extends laterally beyond a corresponding lip a distance that is twice the height of the gaps.

* * * * *